Nov. 12, 1963   P. A. RAULT   3,110,657
DEVICE FOR MEASURING THE TEMPERATURE
INSIDE A NUCLEAR REACTOR
Filed March 8, 1960   4 Sheets-Sheet 1
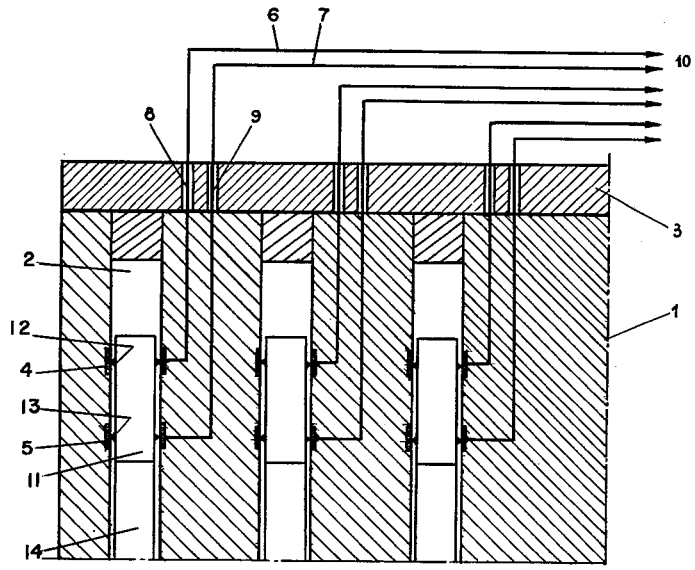
Fig_1
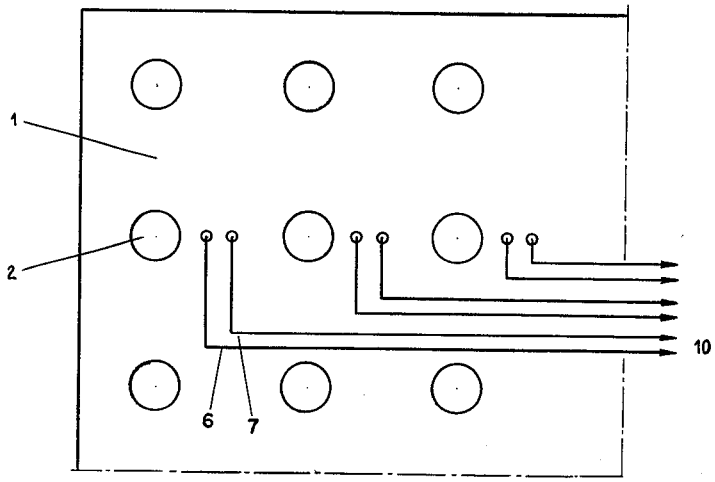
Fig_2
INVENTOR
PIERRE ALBERT RAULT
BY Craig and Freudenberg
ATTORNEYS INVENTOR
PIERRE ALBERT RAULT
BY Craig and Freudenberg
ATTORNEYS Nov. 12, 1963    P. A. RAULT    3,110,657
DEVICE FOR MEASURING THE TEMPERATURE
INSIDE A NUCLEAR REACTOR
Filed March 8, 1960    4 Sheets-Sheet 4

INVENTOR
PIERRE ALBERT RAULT
BY Craig and Freudenberg
ATTORNEYS 3,110,657
DEVICE FOR MEASURING THE TEMPERATURE INSIDE A NUCLEAR REACTOR
Pierre Albert Rault, Boulogne-sur-Seine, France, assignor to Compagnie Industrielle des Telephones, Paris, France, a French corporation
Filed Mar. 8, 1960, Ser. No. 13,493
Claims priority, application France Mar. 13, 1959
7 Claims. (Cl. 204—193.2)

The object of the present invention is a device which makes it possible to measure permanently and with complete certainty the temperature prevailing inside nuclear reactors comprising channels in which cartridges containing radio-active elements are arranged.

A measurement of this kind is very difficult to carry out by the conventional methods because on the one hand the reactor is usually arranged in an enclosure containing a pressurised gas, and, on the other hand, access is impossible while it is in operation, owing to the risk of radiation.

Nevertheless, the radio-active elements are usually arranged in a sheath inside the cartridges, and it is necessary to know the temperature of these sheaths at any time, in order to control the operation of the reactor and to obtain its maximum output.

The device according to the present invention which makes it possible to solve this problem, is characterized in this, that it comprises on the one hand fixed conductive rings flush with the internal surface of the channels of the reactor, and connected, by means of connections passing through the mass thereof to an indicator device, and, on the other hand, cartridges containing a thermo-couple in contact with the sheath covering the radio-active element, said couple being connected to external brushes, in such a way that when said cartridges are put in place in the channels, the brushes come into contact with the fixed rings, which effects the connection of the thermo-couple to the indicator device.

Cartridges of this kind, equipped in this way, can be introduced into the channels of the reactor in the same way as the ordinary cartridges, without any particular difficulty. Similarly ordinary cartridges can be introduced into the channels provided with rings, without any difficulty resulting.

Figure 3:
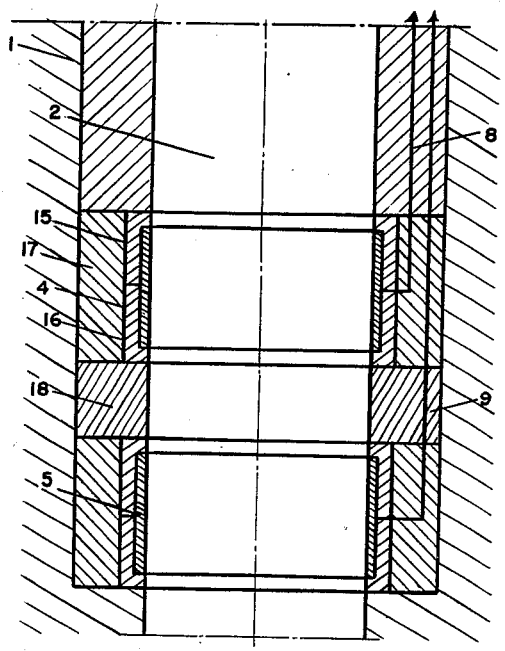
Figure 4:
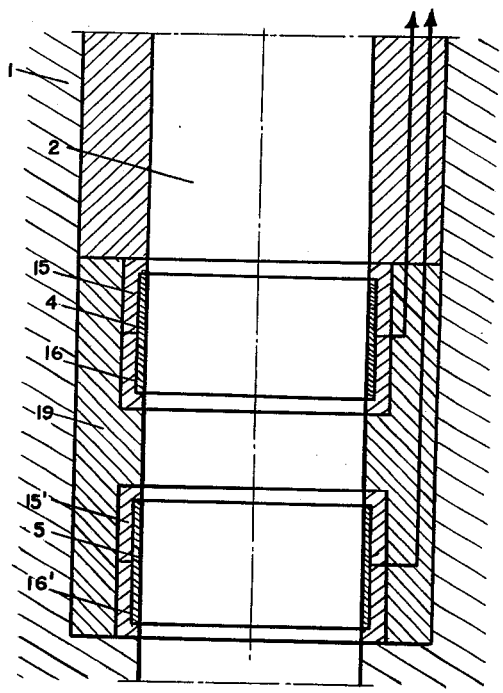
Figures 5, 6:
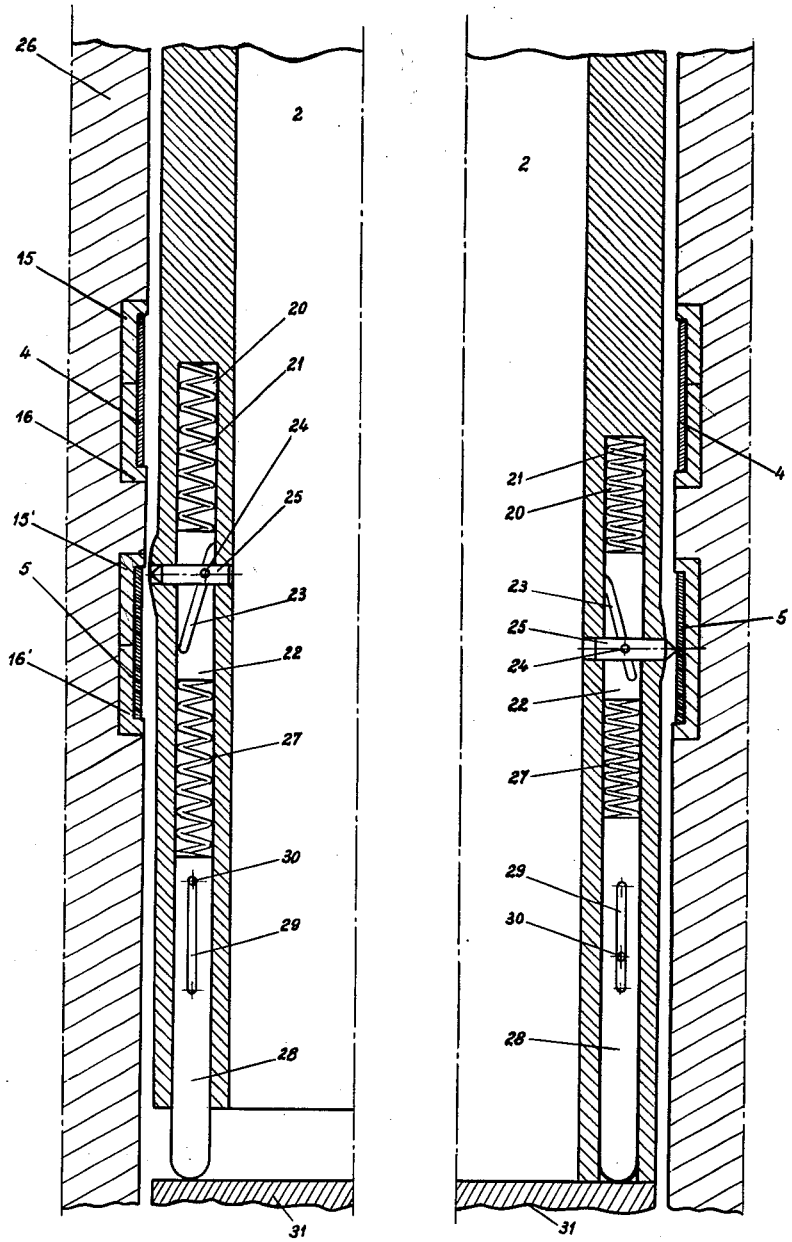

The attached drawings represent, by way of example, various possible embodiments of the device according to the invention. FIGS. 1 and 2 respectively are general views, in vertical cross-section and in elevation, of a reactor equipped in accordance with the invention; FIGS. 3 and 4 are views in vertical cross-section of a reactor channel, showing in more detail the manner in which the conductor rings can be mounted; FIGS. 5 and 6 are vertical half-sections of a channel showing, in two different positions, a cartridge with disappearing brushes; finally FIGS. 7 and 8 show respectively in horizontal and vertical cross-section how a thermo-couple can be connected inside a cartridge.

Figure 7:
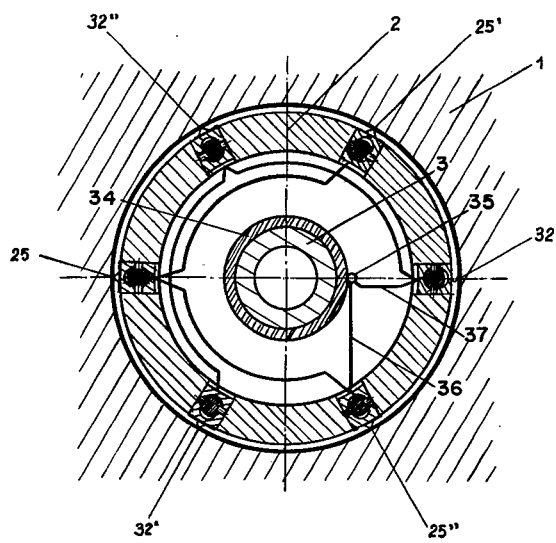
Figure 8:
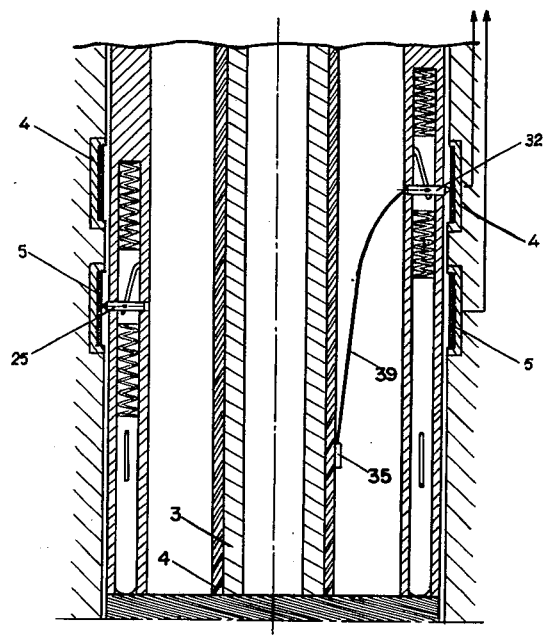

In FIGS. 1 to 6, the radio-active element which is inside the cartridges is not shown, while it appears in FIGS. 7 and 8.

FIG. 1 shows a reactor block 1, provided with a certain number of channels such as 2, closed at the top by a baffle plate 3. The channels represented are each provided with two conductor rings 4 and 5, flush with their internal surface, and insulated from each other. These rings are respectively connected by connecting wires 6, 7, passing through the upper plate 3 in water-tight glands 8, 9 to a measuring device 10 which is not shown.

Moreover, cartridges such as 11 contain a thermo-couple (not shown) connected to brushes 12, 13, which when the cartridge is at the right height in the channel, come into contact respectively with the rings 4, 5, so that the thermo-couple is then connected to the device 10. 14 represents another, ordinary radio-active cartridge, arranged in the channel 2, and on which rests the special cartridge 11.

In FIGS. 1 and 2 only three channels equipped with rings are shown, but it is obvious that there may be any number of these.

FIGS. 3 and 4 show in detail two possible ways of mounting the conductor rings in the channels. According to FIG. 3, each conductor ring, such as 4, is fitted in between two insulating rings 15, 16, themselves mounted in a graphite ring, such as 17. The two sets of rings made up in this way are kept at the desired distance by means of a spacer ring 18.

According to FIG. 4, the two conductor rings 4, 5, respectively fitted between two pairs of insulating rings 15, 16 and 15', 16', are mounted in the same graphite ring 19.

FIG. 5 and 6 are half-sectional longitudinal views representing a reactor channel containing, in two different positions, a measuring cartridge with disappearing brushes.

The measuring cartridge contains in the thickness of its wall a certain number of blind longitudinal channels such as 20, in each of which are arranged a first spring such as 21, arranged at the bottom of the channel, then a free piston 22 provided with an inclined groove 23, in which can be displaced a pin 24 on which is articulated a brush 25 capable of projecting through a transverse hole in the wall of the cartridge, in order to come to rest against the wall 26 of the channel. Under the piston 22 is arranged a second spring 27, then a sliding rod 28, of which the longitudinal displacement is restricted by means of a slot 29 in which is engaged a spur 30 integral with the wall of the cartridge.

The device then operates as follows:

When the measuring cartridge has not yet been introduced into the channel of the reactor or at least when it is not yet resting on another cartridge 31 (FIG. 5), the sliding rod 28 is thrust back downwards by the spring 27, and similarly the piston 22 is thrust down by the spring 21: the pin 24 is then pushed towards the internal wall of the cartridge and drives in the same direction the brush 25, which then disappears into the thickness of said wall and does not project towards the outside. There is therefore nothing to interfere with the insertion and sliding of the cartridge into the reactor channel.

FIG. 6 is a sectional view showing the same measuring cartridge, the bottom of which has come up against the other cartridge 31 (FIG. 6); the sliding rod 28 of the contact assembly then being pushed upwards, and, by means of the spring 21 raises the piston 22, of which the inclined slot 23 forces the pin 24 to shift towards the outside, and consequently the brush 25 to project to the outside and to come in contact with the fixed ring 4, arranged in the wall of the channel 2 of the reactor.

The dimensions of the sliding rod, of the piston and of the brush are determined in such a way that the brush comes into contact with the ring slightly before the cartridge rests on the other cartridge below it, in this way the brush rubs on the ring during the end of the descent of the cartridge, which helps to ensure a better contact by means of a self-cleaning of the brush and of the contact ring.

As shown in FIGS. 7 and 8, the measuring cartridge comprises on its periphery several disappearing brushes, distributed on at least two different levels, in order to cooperate respectively with the two fixed rings 4 and 5 arranged at different heights in the channel of the reactor. For example, the cartridge may comprise three brushes 25, 25′, 25″ arranged in 120° with respect to each other in a lower plane, in order to co-operate with the lower ring 5, and three brushes 32, 32′, 32″, arranged on a higher plane, and staggered by 60° with respect to the brushes of the lower plane, in order to co-operate with the upper ring 4.

It should be pointed out that, since the fixed rings are circular, the brushes always ensure contact with said rings; whatever the positioning of the cartridge, the latter can therefore be introduced into the channel of the reactor without any special precautions.

As has previously been stated, there is arranged axially in the cartridge 11 a small rod 33 of radio-active material, possibly covered with a sheath 34. A thermo-couple 35 is arranged in contact with said sheath, and it is respectively connected by conductors 36 and 37 to the brushes 25, 25′, 25″ on the one hand, and 32, 32′, 32″ on the other.

Of course the example just described with reference to the attached drawings is in no way limitative, and any other embodiment in conformity with the general definition of the invention could be adopted without departing from the scope of the invention.

What is claimed is:

1. In a nuclear reactor comprising a reactor block structure provided with a plurality of fuel cartridge channels, a plurality of fuel cartridges disposed in respective fuel cartridge channels, at least one of said channels having electrical conductor means disposed on the inner surface thereof, at least one of said fuel cartridges having electrical contact means secured thereto, said electrical contact means being housed at least partially in recess means provided in said cartridge, means to maintain said electrical contact means substantially within said recess means during introduction of said cartridge into its respective channel, means to displace said electrical contact means partially out of said recess means into contact with said electrical conductor means upon positioning of said cylinder in an operative position, and means connecting said electrical conductor means to an indicator device disposed outside the reactor, said means retaining said electrical conductor means within said recess means including spring means and a reciprocable member both within aperture means provided in said cylinder and extending in the longitudinal direction thereof.

2. In a nuclear reactor as claimed in claim 1, wherein said reciprocable member is provided with a groove inclined to the direction of reciprocation, and pin means operatively connected to said electrical conductor means and slidable within said groove.

3. A nuclear reactor as defined in claim 1, wherein said electrical conductor means on said inner surface extends substantially around the entire circumference of said inner surface.

4. A nuclear reactor as claimed in claim 1, wherein said electrical contact means include brush means adapted to abut against said electrical conductor means, and further comprising thermocouple means within said reactor operatively connected to said electrical contact means.

5. A device for measuring the temperature within a nuclear reactor comprising a cartridge member adapted to be inserted in a fuel channel of a reactor, said cartridge member being provided with a first channel extending longitudinally of said cartridge member and being open at one end thereof, a transverse channel provided through a wall of said cartridge member and extending into said first channel, rod-like means slidable within said first channel, spring means to normally urge a portion of said rod-like means out through the open end of said first channel, electrical contact means extending at least partially within said transverse channel and connected to a portion of said rod-like means, and spring means acting upon said last-mentioned portion of said rod-like means to tend to retain said electrical contact means substantially within said transverse channel during insertion of said device into a fuel channel.

6. A device according to claim 5, wherein said electrical contact means includes means slidable within an inclined groove provided in said rod-like member.

7. A device according to claim 5, further comprising means to limit the projection of said rod-like means through the open end of said first channel.

References Cited in the file of this patent
UNITED STATES PATENTS 2,949,415     Stubbs et al.             Aug. 16, 1960
3,021,274     Fifield et al.             Feb. 13, 1962